Sept. 9, 1941.  B. L. QUARNSTROM  2,255,472
TUBE AND METHOD OF MAKING TUBE
Filed Feb. 28, 1938
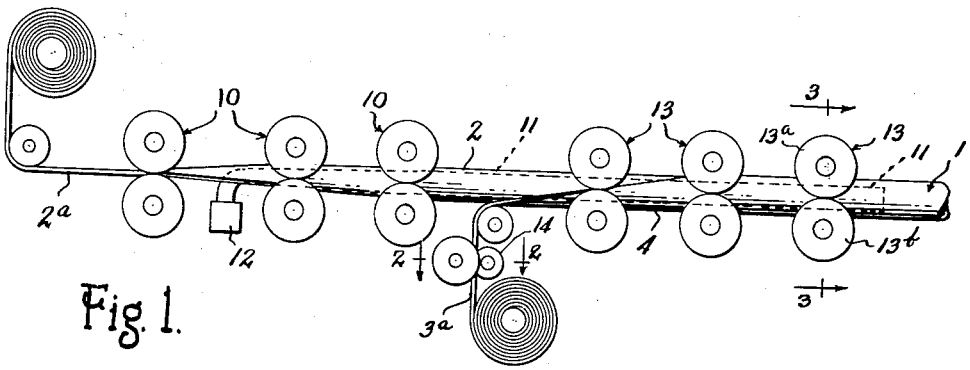
Fig. 1.
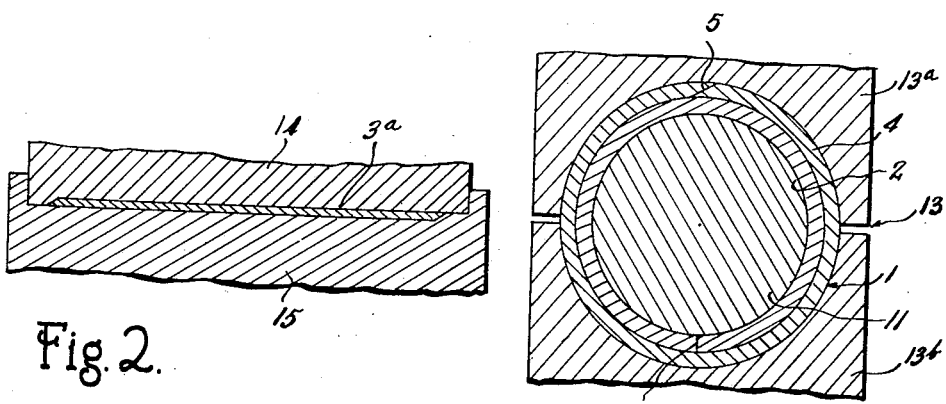
Fig. 2.
Fig. 3.
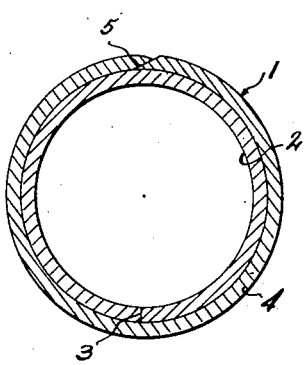
Fig. 4.
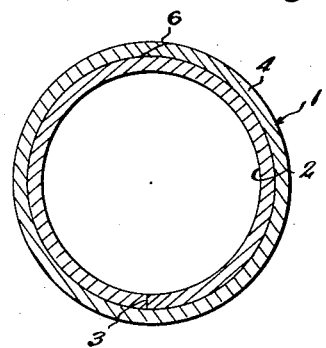
Fig. 5.
INVENTOR.
Bert L. Quarnstrom
BY Barnes, Kisselle, Laughlin & Raisch
ATTORNEY.S

Patented Sept. 9, 1941

2,255,472

UNITED STATES PATENT OFFICE 2,255,472

TUBE AND METHOD OF MAKING TUBE

Bert L. Quarnstrom, Detroit, Mich., assignor to Bundy Tubing Company, Detroit, Mich., a corporation of Michigan Application February 28, 1938, Serial No. 193,143

3 Claims. (Cl. 29—188)

This invention relates to tube and a method of making same. It is concerned particularly with a tube which is made from a plurality of strips of metal stock.

For some uses it is preferred that tubing formed from strip stock have plural ply walls, and tubing with plural ply walls is used for such things as gasoline lines, oil lines, hydraulic brake lines, oil conduits for engines, and in refrigeration and heat exchange arts. One way of obtaining a plural ply wall is to fashion two or more strips into tubular form, one over the other, with the edges of each strip in a joint or seam and preferably with the edges circumferentially removed from each other or diametrically opposite each other. The tube may be completed by a sealing metal which unites the plies and seams.

In order that the two plies be most effective and in order that there is an efficient seal between the plies, the plies must be in tight engagement with each other. Also the edges of the strips must come together properly in a seam or joint. It will be seen that the width of the strips from which such a tube is made must be held to very close tolerances where the edges are disposed in abutting relationship. The inner ply more or less provides a form around which the outer ply may be fashioned; and if the strip stock for the inner ply is a little oversize, the edges of the outer ply will not come together; if the width of the strip for the inner ply is a little undersize, the abutting edges of the strip for the outer ply may meet each other with resultant compression of the metal, and this may cause voids or spaces between the plies. In the same manner, if the outer ply is undersize or oversize as to width, the seam is not properly formed and there may be voids or small spaces between the plies. Variation in the thickness of the stock for either or both plies will also cause difficulties in obtaining tight engagement between the plies and a proper seam structure. For example, the stock from which the inner ply is formed may at times have a little excess thickness and at times be a little thinner than that specified, with resultant variations in the outside diameter of the inner ply. This may result in the edges of the outer ply not coming together, or in compression of the metal at the edges where they come together too closely with resultant voids or spaces between the plies.

Such a tube may be sealed by a metal which has been rendered molten and which melts at a lower temperature than the strip stock of which the tube is made. Tubing of this kind can be made from strip steel stock with the seams and plies united by soft or hard solder, an example of soft solder being a lead and tin alloy, and hard solder examples being copper or a cuprous metal. Also, this tube may be made of copper or cuprous strip stock with the plies and seams united by a sealing metal which melts at a lower temperature than the strip stock, such as solder or other metal or alloys of metals. These are but examples of metals which may be used.

In accordance with the present invention the edges of the strip which form the inner ply are arranged to be brought into direct abutting relationship; the edges of the strip which forms the outer ply are arranged so that they are overlapped in varying degrees in a scarfed joint to provide a tight engagement of the plies and a good seam construction, even though there are variations in the width of one or both strips or variations in stock thickness. The edges of the strip which form the outer ply may be beveled so as to provide the scarfed joint. The scarfed edges may be overlapped to a greater or lesser extent to thus accommodate for variations in the width of the inner ply, outer ply, or both. Thus additional costs in the manufacture of the strip, which would otherwise occur due to the maintaining of extra close tolerances, are eliminated, and at the same time there is assurance that the plies will be tight against each other and that the seams will be tight with no gaps or undue compression or deformation of the metal at the seams. Also the scarfed edges adjust themselves to each other to insure tight engagement of the plies and proper seam structures even though the thickness of one or both strips vary.

In the making of a tube of this construction, the inner ply provides a form of a solid or non-compressible nature around which the outer ply may be fashioned. Pressure may be applied to the outside of the tube without collapsing the inner ply, thus to bring the inner and outer plies into tight engagement with each other and to properly form the seam structures even though there is no support from the interior of the tube. For example, when the tube is subjected to heat to melt the sealing metal, it may be desirable to subject the tube to outside pressure to insure proper tightness of the seams and plies, or to size the tube, or for any other purpose, and the inner ply withstands such pressure effectively even though it be not supported from the interior. Thus a strong, efficient tube structure can be made without any of the defects which may be caused by variation in the width of the strips, the thickness of the strips, or both width and thickness, and this is accomplished economically due to the fact that there is a saving in the preparation of the strips, in that the tolerances for strip width and thickness do not have to be so accurately maintained.

In the accompanying drawing:

Fig. 1 is a rather diagrammatic view illustrating how the tube of the present invention may be made.

Fig. 2 is an enlarged cross sectional view taken substantially on line 2—2 of Fig. 1.

Fig. 3 is an enlarged cross sectional view taken substantially on line 3—3 of Fig. 1 and also showing the tube in cross section.

Fig. 4 is a cross sectional view taken through a tube designed to illustrate a situation where the strip for the inner ply is a little too wide or the strip for the outer ply is a little too narrow.

Fig. 5 is a similar cross sectional view designed to illustrate a situation where the strip for the inner ply is a little too narrow or the strip for the outer ply is a little too wide.

The tube is generally illustrated at 1 and, as shown in Fig. 3, has an inner ply 2 fashioned from strip stock with its edges in a butt seam 3. The tube has an outer ply 4 contiguous to the inner ply, and the edges of this strip are beveled so as to provide an overlapping or scarfed seam 5.

This tube may be made after the manner illustrated in Fig. 1, this view illustrating a tube rolling mill but which is not shown in detail, as tube mills of this type are known to those versed in the art. There is a series of forming rolls 10 into which the strip 2a for forming the inner ply moves, and it is fashioned into tube with a rolling movement. The seam 3 is lowermost as shown. An arbor 11 lies within the tube and it may be supported by a bracket 12, and the inner ply is substantially in complete tubular form after it leaves the rollers 10. A second set of forming rollers is illustrated at 13 through which the inner ply moves and strip stock 3a for the outer ply is fed to the rolls 13 and fashioned into tubular form around the outer ply. The seam 5 is uppermost as shown.

The beveling of the edges of the outer ply may be accomplished as the strip moves from the supply reel to the rolls 13. One way of doing this is by the use of pressure rolls 14 and 15 which apply pressure to the edges of the strip and are fashioned to bevel the same as shown in Fig. 2.

Now it will be seen that since the edges of the inner ply 2 come into abutting relationship, that the exterior circumferential extent or outside diameter depends upon the width of the strip and thickness of the strip, and in the manufacture of such strip there may be normally some variation in these factors. Usually strip this narrow is cut from relatively wide strips, and the variations may occur in the slitting process. However, the beveled edges may be overlapped a greater or lesser extent to take care of this situation. As set forth above this also takes care of the variation in the width of the outer ply.

The final rolls 13a and 13b of the set 13 may be arranged to apply considerable pressure to the tubular form, and the tubular form is supported in its interior by the arbor 11. Therefore, the outer ply is pressed tightly against the inner ply. In some cases the scarfed edges may not overlap to their full extent as depicted in Fig. 5. However, the pressure of the rolls and the presence of the arbor will cause the outer ply to tightly engage the inner ply and the scarfed edges overlap a sufficient distance for an adequate and efficient seam when united by a molten sealing metal. In some instances the scarfed edges may overlap a little more than that of a perfect overlap, but the compression of the rolls 13a and 13b with the underlying arbor 11 causes some flow of the metal so that the scarfed edges are caused to have a surface to surface contact with each other and there might be a small excess overlap as at 6.

After this tube is formed it will be understood that it may be subjected to an operation for uniting the plies and seams with molten metal. This may be done in a number of ways, as for example by carrying the molten metal into position in the form of a coating on the surfaces of one or both plies and then subjecting the tube to heat to melt the coating metal. In this connection, if the ply 3a is coated the coating remains on the beveled surfaces where the bevel is accomplished by compression. On the other hand, one or both strips may not be precoated and molten sealing metal may be applied to the formed tube. In this case the molten metal will run into the seam 5 and between the plies and to the seam 3. Such molten metal, particularly copper, readily flows in between such tightly engaged surfaces; and in making a copper welded joint or copper brazed joint, whichever term is desired, the tighter the surfaces are together, the better the resultant joint.

What is claimed is:

1. The method of making double ply tubing from two strips of stock of indefinite length which comprises moving the strips longitudinally, fashioning one strip while so moving, into tubular form to constitute an inner ply and disposing the edges of said strip in abutting relationship to form a butt seam running lengthwise of the tube, beveling the edges of a second strip of stock, fashioning the second strip of stock around the first while both strips are moving longitudinally, disposing the beveled edges in a scarfed joint running lengthwise of the tube and circumferentially removed from the said butt joint, and applying pressure to the tube to cause the beveled edges to seat upon each other to accommodate differentials in stock width without substantial change in the thickness of the tube wall.

2. A tube with a double ply wall fashioned from strip stock of indefinite length comprising a strip of metal stock fashioned into hollow cross sectional form, the edges of said strip being in abutting relationship to form an inner ply of definite cross dimensions, another strip of metal stock fashioned around the inner ply, the edges of said other strip of stock being beveled and overlapped in a scarfed joint to form an outer ply adjustable to the inner ply, the joints and plies being united by a sealing metal.

3. A tube fashioned from strip stock of indefinite length comprising a strip of metal stock fashioned into hollow cross sectional form, another strip of metal stock fashioned into hollow cross sectional form around the first to provide a double ply tube wall, the edges of the first mentioned strip being substantially perpendicular to the body of the strip and disposed in a butt joint, whereby the inner ply has definite cross dimensions, the edges of the other strip being beveled and overlapped in a scarfed joint, whereby the outer ply is adjustable to the inner ply, said joints being spaced from each other circumferentially of the tube, and the plies and joints being united by a sealing metal.

BERT L. QUARNSTROM.